United States Patent [19]

Bradley

[11] Patent Number: 5,999,321

[45] Date of Patent: Dec. 7, 1999

[54] DICHROIC FILTERS WITH LOW NM PER DEGREE SENSITIVITY

[75] Inventor: Ralph Bradley, Ossining, N.Y.

[73] Assignee: Philips Electronics North America Corporation, New York, N.Y.

[21] Appl. No.: 09/100,829

[22] Filed: Jun. 19, 1998

[51] Int. Cl.[6] .................................................. G02B 1/10
[52] U.S. Cl. ........................ 359/587; 359/490; 359/634
[58] Field of Search ................................. 359/246, 250, 359/256, 490, 498, 583, 584, 585, 586, 587, 588, 589, 634

[56] References Cited

U.S. PATENT DOCUMENTS 3,996,461 12/1976 Sulzbach et al. .................... 250/214 R
5,532,763 7/1996 Jansssen et al. ........................ 348/744

*Primary Examiner*—Cassandra Spyrou
*Assistant Examiner*—Craig Curtis
*Attorney, Agent, or Firm*—John C. Fox

[57] ABSTRACT

Multilayer thin film dichroic filters composed of alternating layers of high (H) and low (L) refractive index have three groups, a lower group next to the substrate having a ratio Ra of high and low index layers Ra1; a second mid group having a ratio Ra of high and low index layers Ra2; and a third upper group having a ratio Ra of high and low index layers Ra3; and the ratios have the relationship Ra1<Ra2<Ra3. Such filters exhibit improved angle sensitivity and wavelength transition values, and are useful for example in color projection displays.

30 Claims, 5 Drawing Sheets

DICHROIC FILTERS WITH LOW NM PER DEGREE SENSITIVITY

BACKGROUND OF THE INVENTION

This invention relates to dichroic color filters having low sensitivity to the incident angle of the wavelengths to be filtered, and also relates to projection systems incorporating such filters.

Dichroic color filters are conventionally formed by depositing a multilayer thin film structure on a transparent substrate. The multilayer structure is designed to transmit a selected band of wavelengths from the visible spectrum, and reflect the non-selected wavelengths.

Such dichroic color filters are useful, for example, in color projection display systems, in which they have been employed to separate a white light source into red, blue and green sub-beams for separate modulation by corresponding color components of an incoming display signal, and then to recombine the modulated subbeams into a full color display for projection onto a viewing screen.

Modulation of the subbeams is commonly carried out using three separate liquid crystal display (LCD) panels, one for each of the three subbeams. However, in one type of color projection system, described, eg., in U.S. Pat. No. 5,532,763, incorporated herein by reference, the three sub-beams are all modulated by a single LCD panel. This is accomplished by restricting the subbeams into band-shaped cross-sections, with the bands having a height smaller than the height of the LCD panel, and scrolling the color bands sequentially down the LCD panel, while synchronously addressing those portions of the panel which are illuminated by the bands with the corresponding display signal information. Such projection systems are referred to as single panel scrolling raster (SPSR) projectors.

Both three-panel and single-panel type projectors have exhibited lack of color uniformity attributed to the angle sensitivity of the transition wavelength of the dichroic filters.

Unfortunately, the commercially available dichroic filters do not provide the requisite low angle sensitivity. Such filters having the steep transition wavelengths and good transmissions needed for projection display systems exhibit angle sensitivities greater than 1 nm per degree of change of incident ray angle, up to 2 nm per degree or more.

OBJECTS AND SUMMARY OF THE INVENTION

It is an object of the invention to provide improved dichroic filters having reduced angle sensitivity.

It is another object of the invention to provide such dichroic filters having good optical transmission and reflection characteristics.

It is another object of the invention to provide such improved filters having an angle sensitivity which is less than 1.5 nm per degree of change of the incident ray angle, and preferably less than 1 nm per degree.

It is another object of the invention to provide such improved filters having an angle sensitivity which is less than 2 nm per degree of change of the incident ray angle, and having a wavelength transition greater than 4%/nm.

It is another object of the invention to provide a color projection display system incorporating one or more of such improved dichroic filters.

In accordance with a first aspect of the invention, a multilayer thin film color filter for filtering light of substantially linear polarization is provided, the filter having low angle sensitivity and comprising thin film layers H and L of alternating high and low refractive index materials on a substrate, adjacent H and L layers comprising an HL pair and the filter comprising N such HL pairs, each HL pair having a ratio, R, of optical thicknesses nd of the H and L layers, wherein the HL pairs are divided into three groups; a first lower group next to the substrate in which the HL pairs have an average ratio Rag1, a second mid group in which the HL pairs have an average ratio Rag2; and a third upper group in which the HL pairs have an average ratio Rag3; and wherein the ratios have the relationship Rag1<Rag2<Rag3.

In accordance with one embodiment of the first aspect of the invention, at least one half of the HL pairs are in the upper group; preferably, the lower group comprises from 2 to 4 HL pairs, the mid group comprises from 2 to 5 HL pairs, and the upper group comprises from 9 to 15 HL pairs.

In accordance with another embodiment of the first aspect of the invention, the ratio Rag1 is in the range of about 0.2 to 2.2, the ratio Rag2 is in the range of about 1.2 to 6.0, and the ratio Rag3 is in the range of about 2 to 10.

In accordance with another aspect of the invention, a multilayer thin film color filter for filtering light of substantially linear polarization is provided, the filter having low angle sensitivity and comprising thin film layers H and L of alternating high and low refractive index materials on a substrate, adjacent H and L layers comprising an HL pair and the filter comprising N such HL pairs, the HL pairs divided into three groups; a first lower group next to the substrate having an average optical thickness of the H layers Hag1 and an average optical thickness of the L layers Lag1, a second mid group having an average optical thickness of the H layers Hag2 and an average optical thickness of the L layers Lag2; and a third upper group having an average optical thickness of the H layers Hag3 and an average optical thickness of the L layers Lag3, and the average optical thicknesses having the relationships:

Lag1>Lag3;

Hag1<Hag3; and

Lag1>Lag2 or

Hag1<Hag2.

In accordance with one embodiment of this aspect of the invention, the average optical thickness Hag1 is in the range of about 0.5 to 4.0; Lag1 is in the range of about 1.0 to 5.0; Hag2 is in the range of about 0.5 to 4.0; Lag 2 is in the range of about 0.3 to 1.5; Hag3 is in the range of about 1.0 to 5.0; and Lag3 is in the range of about 0.2 to 1.2.

In accordance with a third aspect of the invention, a multilayer thin film color filter for filtering light of substantially linear polarization is provided, the filter having low angle sensitivity and comprising thin film layers H and L of alternating high and low refractive index materials on a substrate, adjacent H and L layers comprising an HL pair and the filter comprising N such HL pairs, each HL pair having a ratio, R, of optical thicknesses nd of the H and L layers, wherein the average ratio Ra increases from the first HL pair to the Nth HL pair, where Ra=$\Sigma_j H/L)/j$, and where j has a value of from 2 to 4.

In accordance with one embodiment of this aspect of the invention, the ratio Ra is within the range of about 0.25 to 8 from the first HL pair to the Nth HL pair.

In accordance with one embodiment of this aspect of the invention, the average optical thickness Ha of the H layers increases from the first HL pair to the Nth HL pair, and the average optical thickness La of the L layers decreases from the first HL pair to the Nth HL pair, where the average is taken over 2 to 4 layer pairs, and preferably, Ha is in the range of 0.3 to 4.5 and La is in the range of 3.5 to 0.1.

In order to minimize the angle sensitivity of the filter, at least some of the thin L layers in the upper group range down to as thin as practical, about 0.5 to 0.25 for vapor deposition, and at least some of the thick H layers range up to as thick as are practical, about 2.5 to 4.0 for vapor deposition. The number of such very thin L and very thick H layers is determined by the optimization merit function governing the design process.

In accordance with another embodiment of the invention, at least one of the H layers in the upper group is a thinner layer, being up to about one half the thickness of the thickest H layer in the upper group. Preferably, the thinner H layers in the upper group have an average thickness within the range of about 1.2 to 1.8, and the remaining thicker H layers in the upper group have an average thickness in the range of about 3.0 to 4.5. Preferably, the ratio of the average thicknesses of the thicker and thinner H layers is in the range of about 2.2 to 3.5.

Such filters of the invention exhibit an angle sensitivity of the filters' transition wavelengths to the change of the angle of incident radiation of less than 2 nm/degree, to less than 1 nm/degree, and wavelength transitions greater than 4%/nm, while maintaining the good-to-excellent transmission and reflection characteristics needed for projection systems.

Such filters are useful in systems of any kind where it is desired to separate and/or recombine light of different wavelengths and where a low sensitivity of transition wavelength to incident ray angle is desired, especially where such filters are used at moderate incident angles, for example, 35 to 55 degrees nominal.

Such filters a re e specially useful for producing primary color beams for LCD and other flat panel projection systems, and in recombining the primary color beams to achieve a full color display for projection onto a viewing screen.

Such filters may be used with either three panel systems or SPSR color systems. Low angle sensitivity increases the color purity of the beams transmitted and reflected by the filters, which contributes to maximum separation and minimal shift of the color primaries, as well as to higher projector efficiency, and thereby brighter displays.

In accordance with yet another aspect of the invention, there is provided a projection display system incorporating one or more of the filters of the invention.

BRIEF DESCRIPTION OF THE DRAWINGS

The invention will now be described in terms of a limited number of preferred embodiments, with reference to the drawings, in which.

DESCRIPTION OF THE PREFERRED EMBODIMENTS

Figure 1:
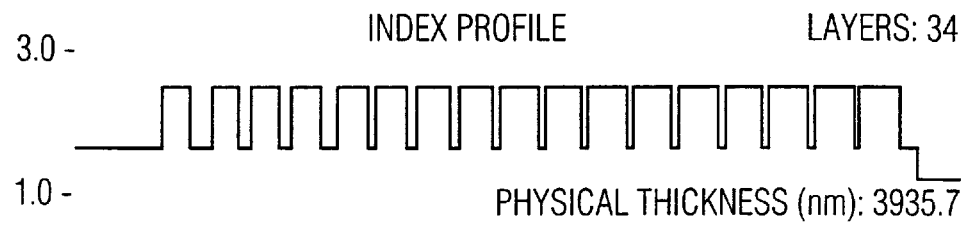
FIGS. 1, 3, 5 and 7 are graphical representations of the layer thickness profiles of four exemplary filters of the invention, designated A through D, respectively.

As used herein, the terms 'thin', 'thick', 'thickness' and the like refer to optical thickness, unless otherwise noted. Optical thickness is measured along the direction a ray incident on the filter at the design angle for the filter takes in the medium. Thus, the optical thickness is the physical thickness of the layer times the refractive index of the medium, divided by the ray angle in the medium, calculated using Snell's law.

Optical thicknesses are generally expressed herein as multiples of a quarter wave of the central wavelength of the wavelength of interest (QWOT). QWOT is derived using a reference wavelength, which is within plus or minus 10% of the cutoff wavelength. The cutoff wavelength is the design wavelength at which (for the desired polarization state, and design angle of incidence) 50% of the incident light is transmitted, and 50% is reflected.

The multilayer thin film dichroic filters of the invention may be produced by any suitable technique, such as the known technique of vacuum evaporation. The high index materials (H) may be chosen from the group including $TiO_2$, $Ta_2O_5$ and $Nb_2O_5$, or other suitable high index material, while the low index materials (L) may be chosen from the group including $SiO_2$ and $MgF_2$, or other suitable low index material. While $TiO_2$ and $SiO_2$ were used due to their predicted reliability and cost, higher and lower index materials than $TiO_2$ and $SiO_2$ would provide design advantages. While all of the filters described herein utilize one material for the H layers and one material for the L layers, a mixture of different H and/or L layers could prove advantageous, at the cost of increased complexity of the structure and its method of fabrication.

EXAMPLES

When designing the filters, a goal was set to keep the angle sensitivity at about 0.75 nm per degree of change of the incident angle or less, while maintaining a wavelength transition slope at about 8% per nm or more, while giving due consideration to maintaining a balance between the slope of the wavelength transition (generally as steep as possible) and the slope of the angle transition (generally as low as possible). In addition, the usual consideration was given to maintaining good efficiency in both the reflection path and the transmission path. These goals were achieved by assigning weights to the appropriate targets in the optimization merit function.

Four exemplary low angle shift color separation/recombination filters were designed for an angle of incidence of 45 degrees, based on the above design principles with the aid of the TFCalc computer program, and evaluated, and the results were confirmed experimentally with actual samples.

The filter types, functions and descriptions are shown in Table I below:

TABLE I

| Filter | Type | Function | Description |
|---|---|---|---|
| A | Long Pass | separates blue by reflection from red and green | 34 layers, 17 layer pairs, 3 groups |
| B | Long Pass | separates green by reflection from red | 36 layers, 18 layer pairs, 3 groups |
| C | Short Pass | combines blue by transmission with green | 40 layers, 20 layer pairs, 3 groups |
| D | Long Pass | combines red by transmission with green and blue | 34 layers, 17 layer pairs, 3 groups |

All of the samples were formed on glass substrates, using $TiO_2$ as the high refractive index material (H) and $SiO_2$ as the low refractive index material (L). All samples started with H adjacent the substrate (referred to as layer 1) and end with L adjacent air (referred to as layer N). All the samples are based on designs which were optimized for linearly polarized light of the S type. Layers are identified as belonging to one of three groups, Group I, next to the substrate (lower group); Group II (mid group); and Group III (upper group).

Layer thicknesses are expressed in quarter wave optical thickness (QWOT), defined as the distance required for light to complete a quarter of a full wavelength of travel, where the wavelength is the reference wavelength, which is chosen to be within 10% of the 50% transmission wavelength at the design angle, which is 45 degrees.

For each sample, a transmittance versus wavelength spectrum is shown, and both the designed and measured angle sensitivity for the design incident angle of 45 degrees is given, in nm per degree, measured between±2.5 nm from the 50% transition point of the cutoff wavelength. The slope of the wavelength transition for the design incident angle of 45 degrees, in percent per nm, measured between±2.5 nm from the 50% transition point, is also given.

Filter A

This filter was given a reference wavelength of 480 nm, and has 4 HL pairs in Group I (lower group), 3 HL pairs in Group II (mid group), and 10 HL paris in Group III (upper group), and is characterized in that the ratio of the average thickness of the high and low index layers Rag1 is about 1.7 for Group I; Rag2 is about 2.8 for Group II, and Rag3 is about 6.9 for Group III. The average thickness of the high index layers Hag1 is about 2.5 and the average thickness of the low index layers Lag1 is about 1.5 for the lower group; Hag2 is about 2.7 and Lag2 is about 1.0 for the mid group, and Hag3 is about 3.6 and Lag3 is about 0.6 for the upper group. The thickness of each layer is given in Table II below and expressed graphically in FIG. 1.

TABLE II

| Group Boundaries | (Filter A) Layer Glass (BK7) BK-7 | QWOT |
|---|---|---|
| 1 I | TiO2 | 2.51 |
| 2 | SiO2 | 2.08 |
| 3 | TiO2 | 2.44 |
| 4 I | SiO2 | 1.15 |
| 5 II | TiO2 | 2.63 |
| 6 | SiO2 | 1.22 |
| 7 | TiO2 | 2.41 |
| 8 II | SiO2 | 1.65 |
| 9 III | TiO2 | 2.46 |
| 10 | SiO2 | 0.75 |
| 11 | TiO2 | 2.73 |
| 12 | SiO2 | 1.12 |
| 13 | TiO2 | 2.83 |
| 14 | SiO2 | 1.00 |
| 15 | TiO2 | 3.23 |
| 16 | SiO2 | 0.57 |
| 17 | TiO2 | 3.68 |
| 18 | SiO2 | 0.49 |
| 19 | TiO2 | 3.53 |
| 20 | SiO2 | 0.61 |
| 21 | TiO2 | 3.48 |
| 22 | SiO2 | 0.59 |
| 23 | TiO2 | 3.59 |
| 24 | SiO2 | 0.49 |
| 25 | TiO2 | 3.70 |
| 26 | SiO2 | 0.46 |
| 27 | TiO2 | 3.57 |
| 28 | SiO2 | 0.55 |
| 29 | TiO2 | 3.52 |
| 30 | SiO2 | 0.49 |

TABLE II-continued

| Group Boundaries | (Filter A) Layer Glass (BK7) BK-7 | QWOT |
|---|---|---|
| 31 | TiO2 | 3.68 |
| 32 | SiO2 | 0.29 |
| 33 | TiO2 | 3.68 |
| 34 III | SiO2 | 1.45 |

Figure 2:
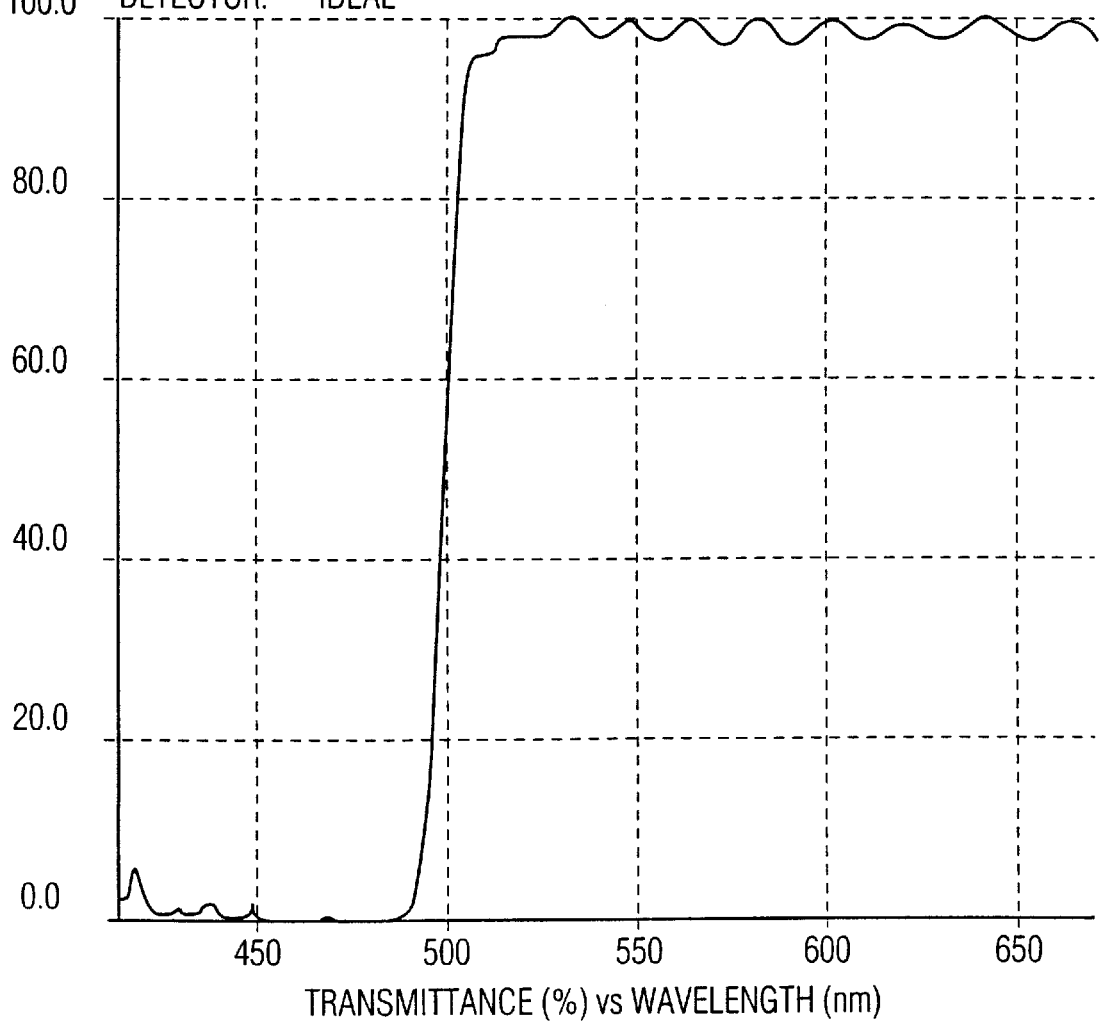
FIGS. 2, 4, 6 and 8 are plots of transmittance in percent versus wavelength in nm for filters A through D, respectively.

The transmittance versus wavelength spectrum of Filter A is shown in FIG. 2, where it is seen that the filter exhibits a very steep wavelength transition at about 500 nm, excellent transmittance above the transition and reflectance below the transition. The designed angle sensitivity is 0.60 nm/degree and the measured value of the sample is 0.58 nm/degree. The measured slope of the wavelength transition is 6.5%/nm.

Filter B

Figure 3:
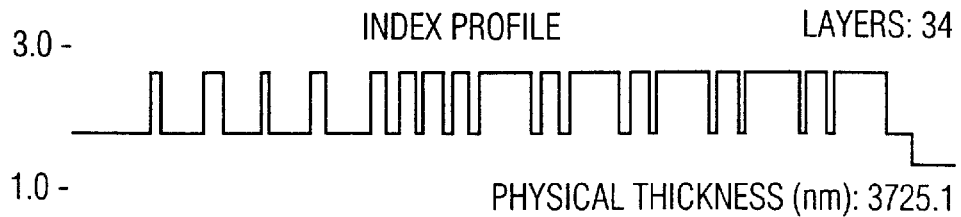

This filter was given a reference wavelength of 550 nm, and has 4 HL pairs in Group I, 5 HL pairs in Group II, and 9 HL pairs in Group III, and is characterized in that the ratio of the average thicknesses of the high and low index layers Rag1 is about 0.3 in Group I; Rag2 is about 3.1 for Group II; and Rag3 is about 6.3 for Group III. The average thickness of the high index layers Hag1 is about 1 and the average thickness of the low index layers Lag1 is about 3.2 for the lower group; Hag2 is about 1.4 and Lag2 is about 0.5 for the mid group; and Hag3 is about 2.8 and Lag3 is about 0.45 for the upper group. The thickness of each layer is given in Table III below and expressed graphically in FIG. 3.

TABLE III

| Group Boundaries | (Filter B) Layer Glass (BK7) BK-7 | QWOT |
|---|---|---|
| 1 I | TiO2 | 0.67 |
| 2 | SiO2 | 2.93 |
| 3 | TiO2 | 1.18 |
| 4 | SiO2 | 3.44 |
| 5 | TiO2 | 0.67 |
| 6 I | SiO2 | 3.29 |
| 7 II | TiO2 | 1.30 |
| 8 | SiO2 | 3.17 |
| 9 | TiO2 | 1.13 |
| 10 | SiO2 | 0.64 |
| 11 | TiO2 | 1.34 |
| 12 | SiO2 | 0.48 |
| 13 | TiO2 | 1.55 |
| 14 | SiO2 | 0.47 |
| 15 | TiO2 | 1.61 |
| 16 II | SiO2 | 0.43 |
| 17 III | TiO2 | 1.62 |
| 18 | SiO2 | 0.43 |
| 19 | TiO2 | 3.91 |
| 20 | SiO2 | 0.44 |
| 21 | TiO2 | 1.69 |
| 22 | SiO2 | 0.43 |
| 23 | TiO2 | 3.87 |
| 24 | SiO2 | 0.43 |
| 25 | TiO2 | 1.62 |
| 26 | SiO2 | 0.43 |
| 27 | TiO2 | 3.83 |
| 28 | SiO2 | 0.43 |
| 29 | TiO2 | 1.69 |
| 30 | SiO2 | 0.44 |
| 31 | TiO2 | 3.88 |
| 32 | SiO2 | 0.45 |

TABLE III-continued

| Group Boundaries | (Filter B) Layer Glass (BK7) BK-7 | QWOT |
|---|---|---|
| 33 | TiO2 | 1.21 |
| 34 | SiO2 | 0.59 |
| 35 | TiO2 | 3.62 |
| 36 III | SiO2 | 1.56 |

Figure 4:
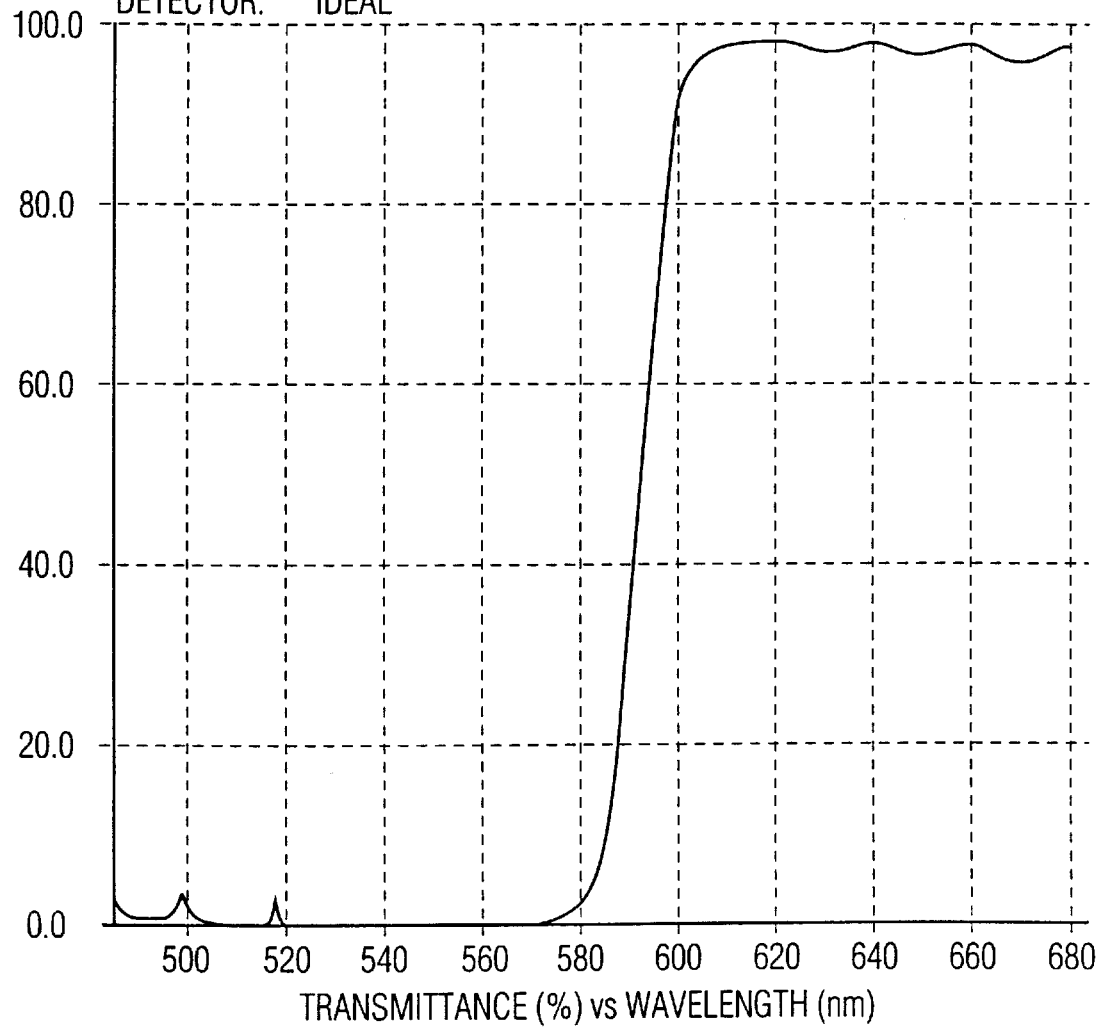

The transmittance versus wavelength spectrum of Filter B is shown in FIG. 4, where it is seen that the filter exhibits a steep wavelength transition in the range of about 580 to 600 nm, excellent transmittance above the transition, and reflectance below the transition. The designed angle sensitivity is 0.78 nm/degree and the measured value of the sample is 0.82 nm/degree. The slope of the wavelength transition is 8.7%/nm.

Figure 5:
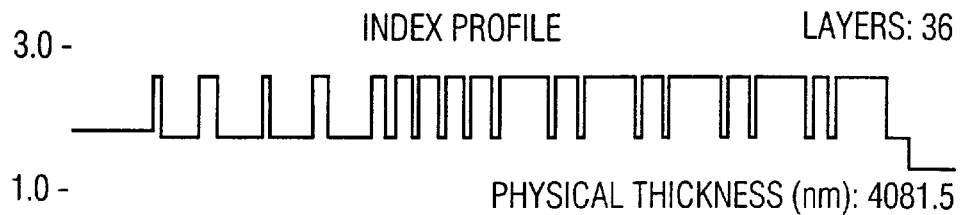

Filter C this filter was assigned a reference wavelength of 500 nm, and has three HL pairs in Group I, 2 HL pairs in Group II, and 15 HL pairs in Group III, and is characterized in that the ratio of the average thicknesses of the high and low index layers Rag1 is about 0.3 for Group I; Rag2 is about 4.3 for Group II; and Rag3 is about 7.6 for Group III. The average thickness of the high index layers Hag1 is about 0.6 and the average thickness of the low index layers Lag1 is about 2.1 for the lower group; Hag2 is about 1.8 and Lag2 is about 0.4 for the mid group: and Hag3 is about 2.0 and Lag3 is about 0.3 for the upper group. The thicknesses of each layer is given in Table IV below and expressed graphically in FIG. 5.

TABLE IV

| Group Boundaries | (Filter C) Layer Glass (BK7) BK-7 | QWOT |
|---|---|---|
| 1 I | TiO2 | 0.57 |
| 2 | SiO2 | 2.30 |
| 3 | TiO2 | 0.89 |
| 4 | SiO2 | 2.17 |
| 5 | TiO2 | 0.38 |
| 6 I | SiO2 | 1.78 |
| 7 II | TiO2 | 1.61 |
| 8 | SiO2 | 0.39 |
| 9 | TiO2 | 2.02 |
| 10 II | SiO2 | 0.45 |
| 11 III | TiO2 | 1.93 |
| 12 | SiO2 | 0.23 |
| 13 | TiO2 | 2.08 |
| 14 | SiO2 | 0.30 |
| 15 | TiO2 | 1.88 |
| 16 | SiO2 | 0.23 |
| 17 | TiO2 | 2.19 |
| 18 | SiO2 | 0.24 |
| 19 | TiO2 | 1.80 |
| 20 | SiO2 | 0.23 |
| 21 | TiO2 | 2.27 |
| 22 | SiO2 | 0.23 |
| 23 | TiO2 | 1.78 |
| 24 | SiO2 | 0.23 |
| 25 | TiO2 | 2.47 |
| 26 | SiO2 | 0.23 |
| 27 | TiO2 | 1.29 |
| 28 | SiO2 | 0.23 |
| 29 | TiO2 | 2.63 |
| 30 | SiO2 | 0.23 |

TABLE IV-continued

| Group Boundaries | (Filter C) Layer Glass (BK7) BK-7 | QWOT |
|---|---|---|
| 31 | TiO2 | 1.28 |
| 32 | SiO2 | 0.23 |
| 33 | TiO2 | 2.61 |
| 34 | SiO2 | 0.23 |
| 35 | TiO2 | 1.37 |
| 36 | SiO2 | 0.23 |
| 37 | TiO2 | 2.33 |
| 38 | SiO2 | 0.52 |
| 39 | TiO2 | 1.64 |
| 40 III | SiO2 | 0.75 |

Figure 6:
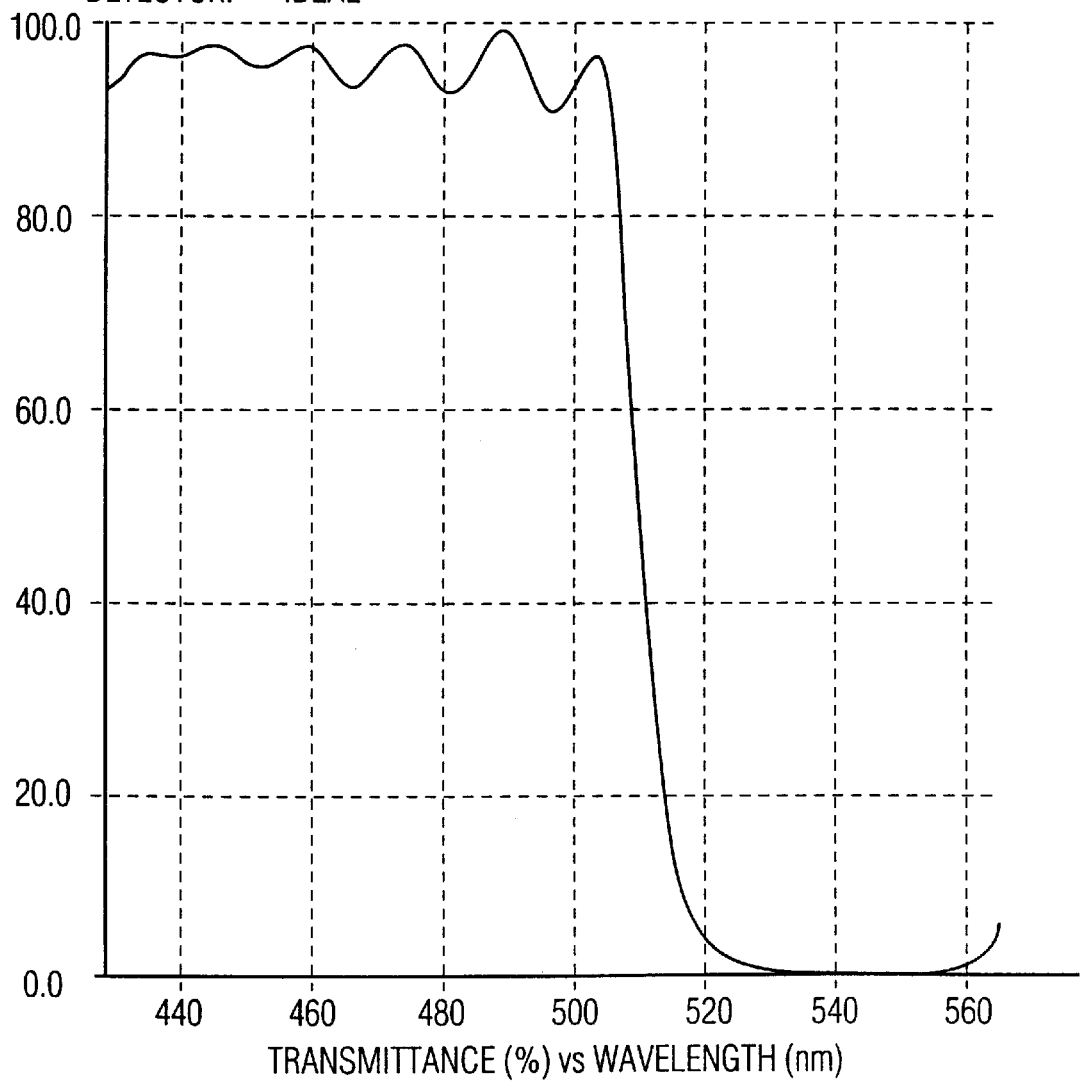

The transmittance versus wavelength spectrum of Filter B is shown in FIG. 6, where it is seen that the filter exhibits a steep wavelength transition in the range of about 500 to 520 nm, very excellent transmittance below the transition, and reflectance above the transition. The designed angle sensitivity is 0.83 nm/degree and the measured value of the sample is 0.86 nm/degree. The slope of the wavelength transition is 6.6%/nm.

Filter D

Figure 7:
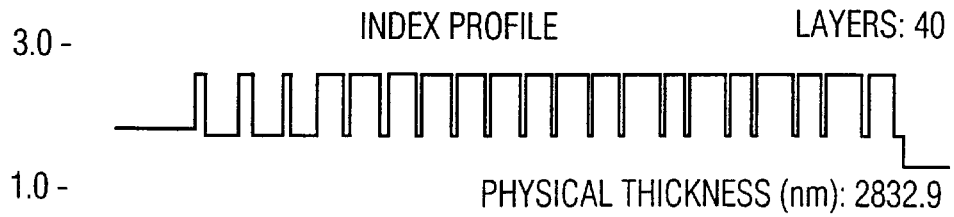

This filter was assigned a reference wavelength of 565 nm, and has 4 HL pairs in Group I, 4 HL pairs in Group II, and 9 HL pairs in Group III, and is characterized in that the ratio of the average thicknesses of the high and low index layers Rag1 is about 0.3 in Group I; Rag2 is about 1.7 for Group II; and Rag3 is about 4.0 for Group III. The average thickness of the high index layers Hag1 is about 0.9 and the average thickness of the low index layers Lag1 is about 2.6 for the lower group; Hag2 is about 1.1 and Lag2 is about 0.7 for the mid group; and Hag3 is about 2.5 and Lag3 is about 0.7 for the upper group. The thickness of each layer is given in Table V below and expressed graphically in FIG. 7.

TABLE V

| Group Boundaries | (Filter D) Layer Glass (BK7) BK-7 | QWOT |
|---|---|---|
| 1 I | TiO2 | 0.60 |
| 2 | SiO2 | 2.63 |
| 3 | TiO2 | 1.37 |
| 4 | SiO2 | 2.36 |
| 5 | TiO2 | 0.52 |
| 6 | SiO2 | 2.66 |
| 7 | TiO2 | 1.07 |
| 8 I | SiO2 | 2.93 |
| 9 II | TiO2 | 0.96 |
| 10 | SiO2 | 0.87 |
| 11 | TiO2 | 1.07 |
| 12 | SiO2 | 0.55 |
| 13 | TiO2 | 1.19 |
| 14 | SiO2 | 0.63 |
| 15 | TiO2 | 1.27 |
| 16 II | SiO2 | 0.67 |
| 17 III | TiO2 | 3.32 |
| 18 | SiO2 | 0.65 |
| 19 | TiO2 | 1.25 |
| 20 | SiO2 | 0.64 |
| 21 | TiO2 | 3.36 |
| 22 | SiO2 | 0.61 |
| 23 | TiO2 | 1.30 |
| 24 | SiO2 | 0.59 |
| 25 | TiO2 | 3.38 |

TABLE V-continued

| | (Filter D) Layer | |
|---|---|---|
| Group Boundaries | Glass (BK7) BK-7 | QWOT |
| 26 | SiO2 | 0.54 |
| 27 | TiO2 | 1.36 |
| 28 | SiO2 | 0.60 |
| 29 | TiO2 | 3.46 |
| 30 | SiO2 | 0.45 |
| 31 | TiO2 | 1.30 |
| 32 | SiO2 | 0.52 |
| 33 | TiO2 | 3.31 |
| 34 III | SiO2 | 1.62 |

Figure 8:
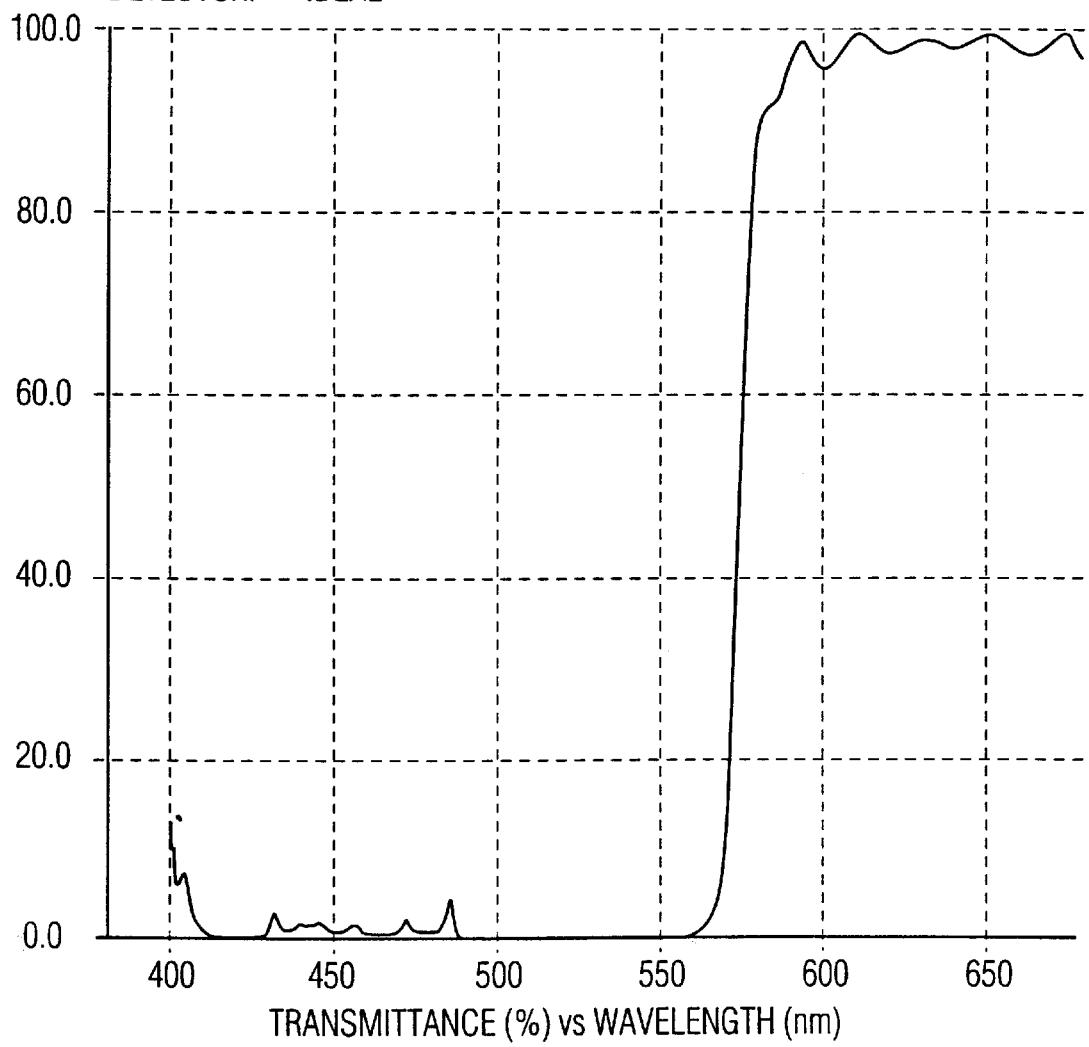

The transmittance versus wavelength spectrum of Filter D is shown in FIG. 8, where it is seen that the filter exhibits a steep wavelength transition in the range of about 570 to 580 nm, excellent transmittance above the transition, and reflectance below the transition. The designed angle sensitivity is 0.77 nm/degree and the measured value of the sample is 0.62 nm/degree. The slope of the wavelength transition is 8.5%/nm.

The largest values of La are found in Group I. With respect to all exemplary filters, the average thickness of the low index layers La in Group I is greater than 1.5, and generally falls around 2. Except for Filter A, the ratio Ra for Group I are all less than 1, and are typically around 0.3. The thicknesses of the H and L layers are more similar in Group II than in Groups I and III, while Ra is greater than 1 in each of the exemplary filters. Ha is greatest in Group III, and the number of HL pairs is also greatest in Group III, comprising about one half or more of all the layer pairs in each of the exemplary filters.

Filters B and D have additional similarities. With respect to Group III, they each have successive H layers (separated by consistently thin L layers) which alternate between being thicker and thinner. For filter B, the thicker H layers are all similar in thickness and have an average thickness of about 3.8, whereas the thinner H layers are also similar in thickness and have an average thickness of about 1.55. The ratio of these thicknesses Hthick/Hthin is appreciable, about 2.5. For filter D, the thicker H layers have an average thickness of about 3.4, while the thinner H layers have an average thickness of about 1.31, for a ratio of about 2.6, similar to that for filter B.

Figure 9:
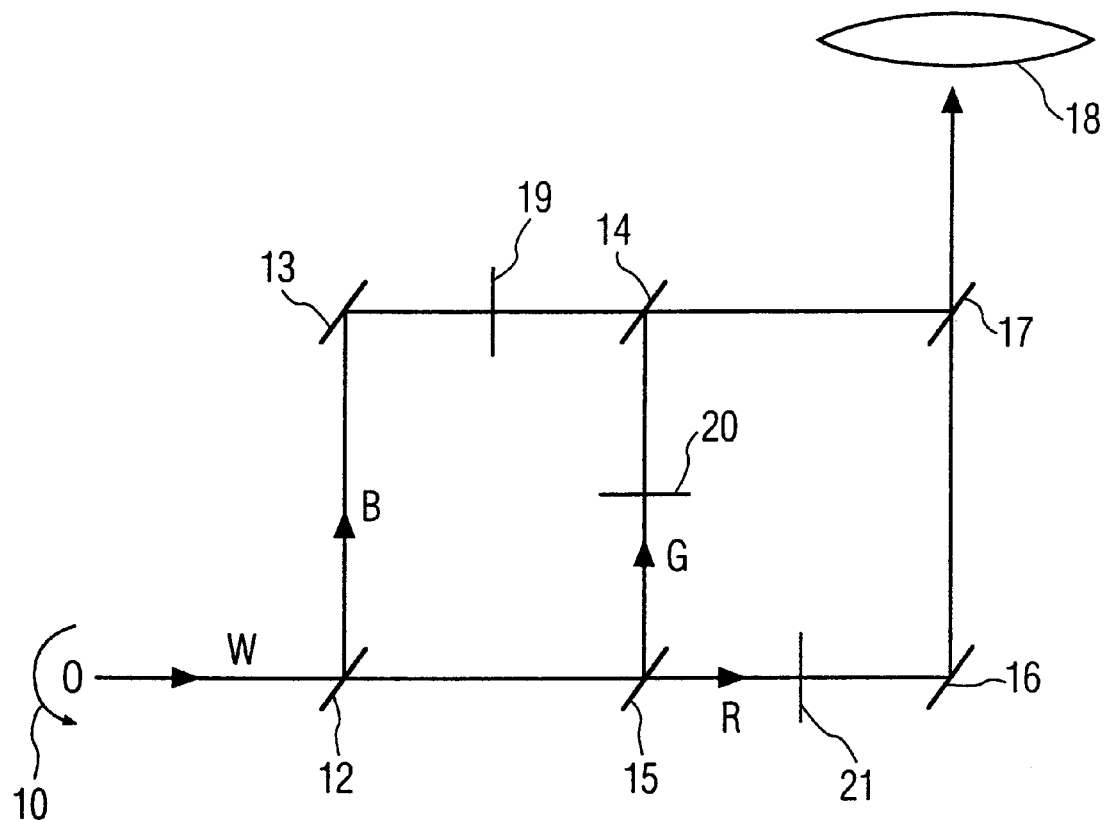
FIG. 9 is a schematic diagram of one embodiment of a color projection display system incorporating at least one of the improved dichroic filters of the invention.

FIG. 9 is a schematic layout of a portion of a color projection display device including a source of white light 10, mirrors 13 and 16, dichroic filters 12, 14, 15 an d 17, and projection lens 18. White light from source 10 strikes filter 12, at which red and green light are transmitted and blue light is reflected. The blue beam is reflected by mirror 13 toward filters 14 and 17. Filter 14 transmits the blue beam to filter 17, and filter 17 reflects the beam toward projection lens 18. The red and green beams transmitted by filter 12 strike filter 15, where green is reflected toward filter 14, and red is transmitted to mirror 16, and then reflected by mirror 16 toward filter 17, where red is transmitted to projection lens 18. The green beam reflected by filter 15 is also reflected by filters 14 and 17, to projection lens 18. Thus, the effect of the arrangement shown is to first split the white beam into red, blue and green beams, and then recombine these three beams for projection to a display surface by lens 18. Inserted into the paths of the blue, green and red beams are electro-optical light modulating means 19, 20 and 21, eg., LCD panels. For simplicity, the lenses needed to direct light along the light paths to the projection lens 18 are not shown.

In an alternative embodiment, the three primary beams are formed into bands and scrolled across a single electro-optical light modulating panel, as described in the above-referenced U.S. Pat. No. 5,532,763.

The invention has been described in terms of a limited number of embodiments. Other embodiments and variations of embodiments will become apparent to those skilled in the art, and are intended to be encompassed within the scope of the invention, as set forth in the appended claims. For example, while the dichroic filters of the invention have been described as multilayer thin film structures of alternating H and L layers on a substrate, one or more additional layers may be present between the structure and the substrate, for example, as a transition layer, or to improve adhesion of subsequent layers and/or to improve optical coupling. Additional layers may also be present on top of the multilayer structure, to provide protection or transition to the interface medium. While the interface medium will normally be air, it could also be a liquid or a solid, as in the case where the multilayer structure is embedded in an optical element such as a prism.

Moreover, which the description has been mainly confined to a discussion of exemplary filters in which HL layer pairs are divided into lower, mid and upper groups, it will be appreciated that layer pairs of one group may sometimes be separated by additional layers or dispersed among other layer pairs in the same or an adjacent group. In some embodiments, an intermediate index material, M, could be in part substituted for some of the H or L layers.

What I claim as my invention is:

1. A multilayer thin film color filter for filtering light of substantially linear polarization, the filter comprising thin film layers H and L of alternating high and low refractive index materials on a substrate, each layer having an optical thickness nd, where n is the refractive index of the material of the layer and d is the physical thickness of the layer, adjacent H and L layers comprising an HL pair and the filter comprising a plurality of HL pairs, each HL pair having a ratio, R, of optical thicknesses nd of the H and L layers, wherein the HL pairs are divided into three groups; a first lower group next to the substrate in which the HL pairs have an average ratio Rag1, a second mid group in which the HL pairs have an average ratio Rag2; and a third upper group in which the HL pairs have an average ratio Rag3; and wherein the ratios have the relationship Rag1<Rag2<Rag3.

2. The filter of claim 1 in which at least one half of the HL pairs are in the upper group.

3. The filter of claim 1 in which the ratio Rag1 is in the range of about 0.2 to 2.2, the ratio Rag2 is in the range of about 1.2 to 6.0, and Rag3 is in the range of about 2 to 10.

4. The filter of claim 1 in which the lower group comprises from 2 to 4 HL pairs, the mid group comprises from 2 to 5 HL pairs, and the upper group comprises from 9 to 15 HL pairs.

5. The filter of claim 1 in which Rag1 is about 1.7, Rag2 is about 2.8, and Rag3 is about 6.9.

6. The filter of claim 5 in which there are 4 HL pairs in the lower group, 3 HL pairs in the mid group, and 10 H/L pairs in the upper group.

7. The filter of claim 1 in which Rag1 is about 0.3, Rag2 is about 3.1, and Rag3 is about 6.3.

8. The filter of claim 7 in which there are 4 HL pairs in the lower group, 5 HL pairs in the mid group, and 9 pairs in the upper group.

9. The filter of claim 1 in which Rag1 is about 0.3, Rag2 is about 4.3, and Rag3 is about 7.6.

10. The filter of claim 9 in which there are 3 HL pairs in the lower group, 2 HL pairs in the mid group, and 15 HL pairs in the upper group.

11. The filter of claim 1 in which Rag1 is about 0.3, Rag2 is about 1.7, and Rag3 is about 4.0.

12. The filter of claim 11 in which there are 4 HL pairs in the lower group, 4 HL pairs in the mid group, and 9 HL pairs in the upper group.

13. The filter of claim 1 in which at least one of the H layers in the upper group is a thinner layer, being up to about one half the thickness of the thickest H layer in the upper group.

14. The filter of claim 13 in which the thinner H layers in the upper group have an average thickness within the range of about 1.2 to 1.8, and the remaining thicker H layers in the upper group have an average thickness in the range of about 3.0 to 4.5.

15. The filter of claim 14 in which the ratio of the average thicknesses of the thicker and thinner H layers is in the range of about 2.2 to 3.5.

16. The filter of claim 1 in which at least one of the H layers has imbedded therein a thin layer of a different material having a thickness of up to about 0.2.

17. The filter of claim 1 in which the last layer is adjacent to a gas medium.

18. The filter of claim 1 in which the last layer is adjacent to a solid or liquid optical medium.

19. A multilayer thin film color filter for filtering light of substantially linear polarization, the filter comprising thin film layers H and L of alternating high and low refractive index materials on a substrate, each layer having an optical thickness nd, where n is the refractive index of the material of the layer and d is the physical thickness of the layer, adjacent H and L layers comprising an HL pair and the filter comprising a plurality of HL pairs, wherein the HL pairs are divided into three groups; a first lower group next to the substrate having an average optical thickness of the H layers Hag1 and an average optical thickness of the L layers Lag1, a second mid group having an average optical thickness of the H layers Hag2 and an average optical thickness of the L layers Lag2; and a third upper group having an average optical thickness of the H layers Hag3 and an average optical thickness of the L layers Lag3, and wherein the average optical thicknesses have the relationships:

Lag1>Lag3;

Hag1<Hag3; and

Lag1>Lag2 or

Hag1<Hag2.

20. The filter of claim 19 in which the average optical thickness Hag1 is in the range of about 0.5 to 4.0; Lag1 is in the range of about 1.0 to 5.0; Hag2 is in the range of about 0.5 to 4.0; Lag 2 is in the range of about 0.3 to 1.5; Hag3 is in the range of about 1.0 to 5.0; and Lag3 is in the range of about 0.2 to 1.2.

21. The filter of claim 20 in which Hag1 is about 2.5, Lag1 is about 1.5, Hag2 is about 2.7, Lag2 is about 1, Hag3 is about 3.6 and Lag3 is about 0.6.

22. The filter of claim 20 in which Hag1 is about 1, Lag1 is about 3.2, Hag2 is about 1.4, Lag2 is about 0.5, Hag3 is about 2.8 and Lag3 is about 0.45.

23. The filter of claim 20 in which Hag1 is about 0.6, Lag1 is about 2.1, Hag2 is about 1.8, Lag2 is about 0.4, Hag3 is about 2 and Lag3 is about 0.3.

24. The filter of claim 20 in which Hag1 is about 0.9, Lag1 is about 2.6, Hag2 is about 1.1, Lag2 is about 0.7, Hag3 is about 2.5 and Lag3 is about 0.7.

25. A multilayer thin film color filter for filtering light of substantially linear polarization, the filter comprising thin film layers H and L of alternating high and low refractive index materials on a substrate, each layer having an optical thickness nd, where n is the refractive index of the material of the layer and d is the physical thickness of the layer, adjacent H and L layers comprising an HL pair and the filter comprising a plurality of HL pairs, each HL pair having a ratio, R, of optical thicknesses nd of the H and L layers, wherein the average ratio Ra increases from the first HL pair to the last HL pair, where $Ra=\Sigma_j(H/L)/j$, and where j has a value of from 2 to 4.

26. The filter of claim 25 in which the ratio Ra is within the range of about 0.25 to 8 from the first HL pair to the last HL pair.

27. The filter of claim 25 in which the average optical thickness Ha of the H layers increases from the first HL pair to the last HL pair, and the average optical thickness La of the L layers decreases from the first HL pair to the last HL pair, where the average is taken over 2 to 4 layer pairs.

28. The filter of claim 25 in which Ha is in the range of 0.3 to 4.5 and La is in the range of 3.5 to 0.1.

29. A color projection display system comprising: a source of white light, means for splitting the light into two or more primary color beams, electro-optic means for modulating the primary color beams in accordance with a display signal, and means for projecting the modulated primary color beams onto a display surface, characterized in that the system includes at least one dichroic filter as claimed in any one of claims 1, 19 and 25.

30. The color projection display system of claim 29 in which means are included for recombining one or more of the primary color beams.

* * * * *